United States Patent

Kawano et al.

[11] Patent Number: 5,727,643
[45] Date of Patent: Mar. 17, 1998

[54] SUSPENSION DEVICE FOR A SNOWMOBILE

[75] Inventors: Shizuo Kawano; Tadaaki Nagata, both of Saitama, Japan

[73] Assignee: Honda Giken Kogyo Kabushiki Kaisha, Tokyo, Japan

[21] Appl. No.: 350,005

[22] Filed: Nov. 29, 1994

[30] Foreign Application Priority Data

Nov. 29, 1993 [JP] Japan .................. 5-298406

[51] Int. Cl.$^6$ .................. B62D 55/112
[52] U.S. Cl. .................. 180/193; 180/9.54
[58] Field of Search .................. 180/190, 193, 180/182, 186, 9.1, 9.5, 9.52, 9.54, 9.56

[56] References Cited

U.S. PATENT DOCUMENTS

| | | | |
|---|---|---|---|
| 3,727,709 | 4/1973 | Newman | 180/193 X |
| 3,744,583 | 7/1973 | Bedard | 180/9.54 |
| 3,773,126 | 11/1973 | Irvine | 180/193 X |
| 3,966,181 | 6/1976 | Lessard | 180/193 X |
| 4,222,453 | 9/1980 | Fixsen et al. | 180/193 |
| 4,314,618 | 2/1982 | Tamura | 180/193 |
| 4,462,480 | 7/1984 | Yasui et al. | 180/193 |
| 4,518,056 | 5/1985 | Kobayashi | 180/193 |
| 4,826,260 | 5/1989 | Plourde | 180/193 X |
| 4,917,207 | 4/1990 | Yasui et al. | 180/193 |
| 5,265,692 | 11/1993 | Mallette | 180/193 |
| 5,370,198 | 12/1994 | Karpik | 180/193 |

FOREIGN PATENT DOCUMENTS 58-50914  11/1983  Japan .

*Primary Examiner*—Kevin Hurley
*Attorney, Agent, or Firm*—Birch, Stewart, Kolasch & Birch, LLP

[57] ABSTRACT

A suspension device for providing a resilient support for a snowmobile body includes a frame for supporting the snowmobile body. A slide rail is operatively connected to the frame for pressing a crawler belt against a snow surface. A swing arm includes a first end pivotally supported on the frame and a second end pivotally mounted on the slide rail. A shock absorber includes a first end pivotally supported on a shaft adjacent to the first end of the swing arm, and a second end of the shock absorber being connected to the frame through a progressive link pivotally supported on the swing arm.

23 Claims, 7 Drawing Sheets

SUSPENSION DEVICE FOR A SNOWMOBILE

BACKGROUND OF THE INVENTION

1. Field of the Invention

The present invention relates to a suspension device for a snowmobile which is propelled on snow by use of a crawler belt.

2. Description of Background Art

For the snowmobile which is propelled on a snow surface by use of a crawler belt, it is necessary to resiliently support the body. For this purpose, in the past, the slide rail for pressing the crawler belt against the snow surface is pivotally supported on the rear lower end of the swing arm having the front upper end swingingly supported on the body frame. In addition, the suspension spring is vertically disposed between the slide rail and the body frame.

However, since the snowmobile has a small vertical space for positioning the suspension spring in the construction, a sufficient buffer effect cannot be exhibited.

In view of the above, Japanese Patent Publication No. 58-50914 discloses a construction in which a rear cushion unit comprised of a hydraulic buffer and a suspension spring is disposed in a horizontal direction within a space surrounded by a crawler belt so that the vertical movement of a slide rail as the snowmobile runs is converted into a horizontal movement through a link to transmit the horizontal movement to the rear cushion unit.

In the suspension device disclosed in the aforementioned Japanese Patent Publication No. 58-50914, both the front end and the rear end of the rear cushion are connected to the slide rail through the link. Therefore, the weight of the rear cushion is added as a lower load of a spring and the fallibility relative to the snow surface is lowered.

OBJECTS AND SUMMARY OF THE INVENTION

The present invention has been achieved for the purpose of enhancing the fallibility of the snowmobile relative to the snow surface. To this end, the present invention provides a suspension device for a snowmobile, which resiliently supports a snowmobile body relative to a slide rail which presses a crawler belt against a snow surface.

A suspension device for a snowmobile is provided wherein the slide rail is pivotally mounted on a rear lower end of a swing arm having a front upper end swingingly supported on a frame on the snowmobile body side. A front upper end of a rear cushion unit includes a hydraulic buffer and a suspension spring being swingingly supported in the vicinity of the front upper end of said swing arm, and a rear lower end of said rear cushion is connected to a link constituting a progressive link mechanism pivotally supported on the swing arm.

The vertical movement of the slide rail as the snowmobile is propelled on a snow surface is converted into an oblique angle, near a horizontal, in the movement to transmit it to the rear cushion unit. As the slide rail assumes an upward position, the transmission speed increases. As a result, a great attenuation force is produced and the displacement changes in a so-called progressive manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 1:
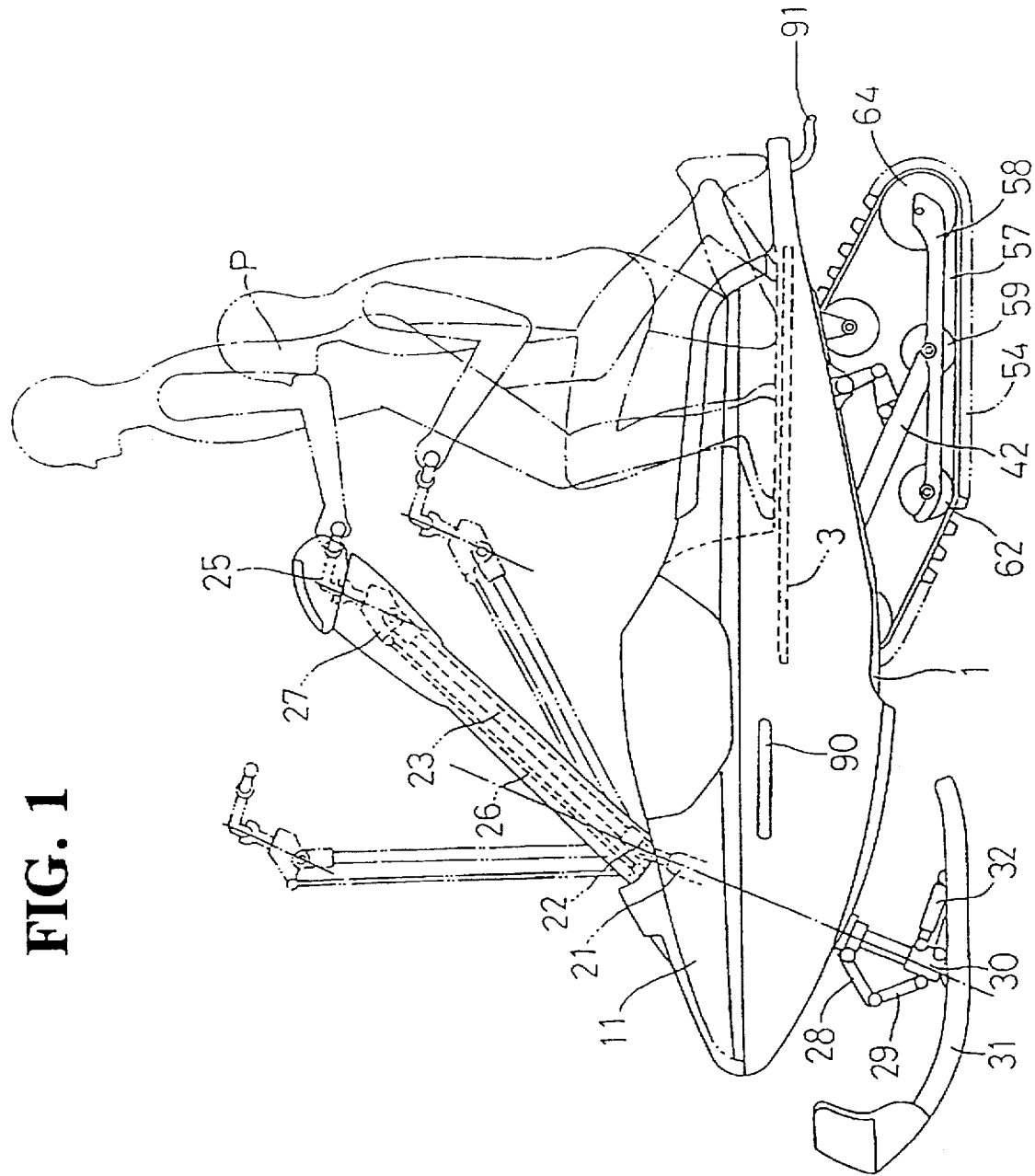
FIG. 1 is a side view of the entire snowmobile to which the suspension device according to the present invention is applied.
Figure 2:
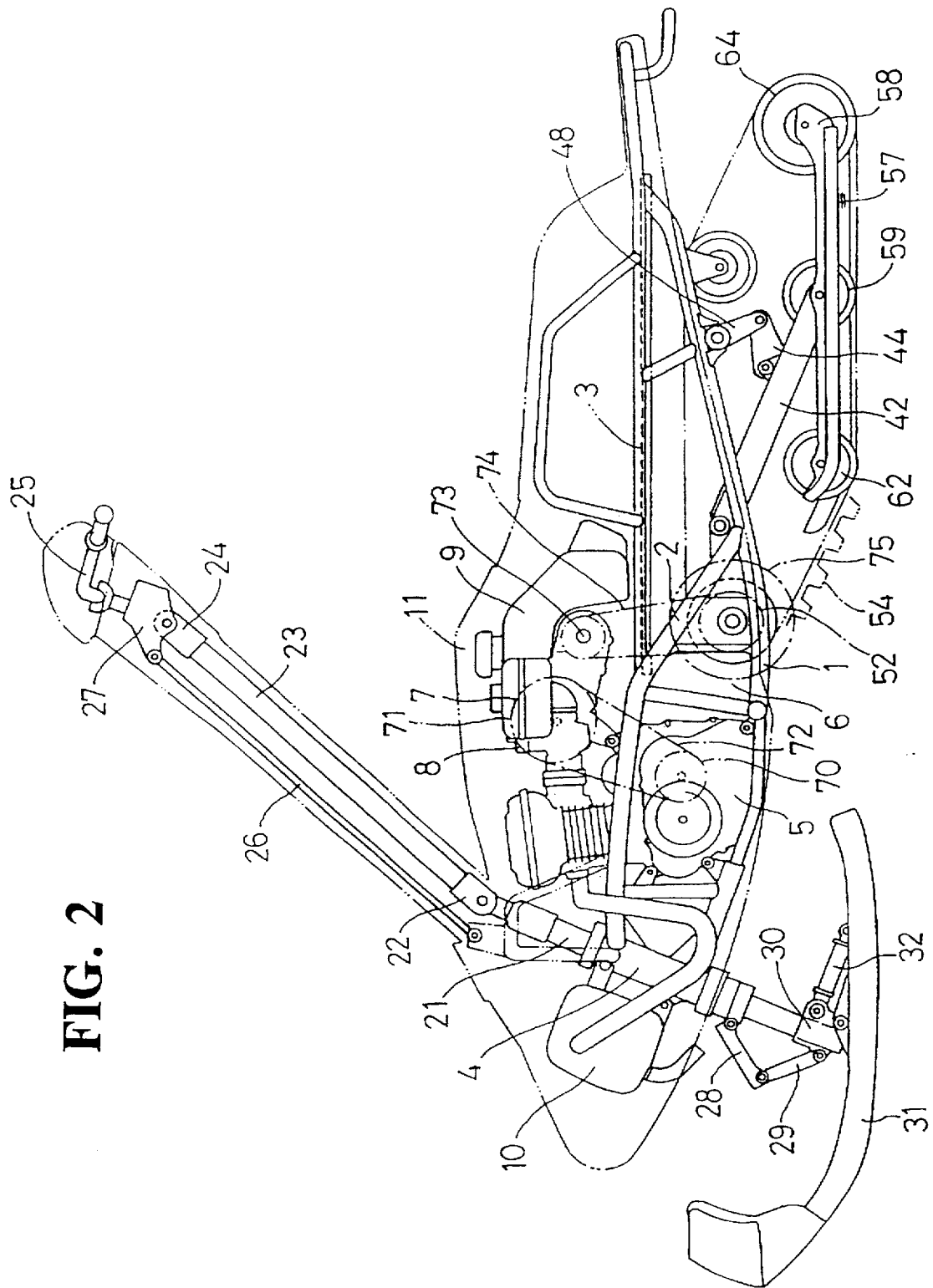
FIG. 2 is a perspective view showing the inside of a body cover of the snowmobile.

An embodiment of the present invention will be described below with reference to the accompanying drawings. FIGS. 1 and 2, are side views of the entire snowmobile to which a suspension device according to the present invention is applied. In the snowmobile, an upper frame 2 is mounted on the front portion of a main frame 1 which includes a pipe. A floor 3 is formed with a passage through which high temperature cooling water from a radiator is passed and provided between a rear portion of the upper frame 2 and a rear end of the main frame 1. A head pipe 4 is mounted on the front end of the main frame 1 and the upper frame 2.

An engine 5 is mounted in a space surrounded by the main frame 1 and the upper frame 2. A transmission case 6 is disposed at the rear of the engine 5. An air cleaner 7, a carburetor 8 and a fuel tank 9 are arranged above the transmission case 6, and a muffler 10 is mounted on the front side of the head pipe 4. All of the above members are covered by a body cover 11.

As illustrated in FIG. 1, a grip portion 90 protrudes from both sides of the body cover 11, and a grip portion 91 is also provided at the rear end of the floor 3.

A steering post 21 is inserted into the head pipe 4. A steering shaft 23 is connected to the upper end of the steering post 21 through a universal joint 22. A handlebar 25 is connected to the upper end of the steering shaft 23 through a universal joint 24. A steering link 26 includes a lower end supported on the body side of the snowmobile so that the steering link 26 may be moved within a vertical area disposed frontwardly of and parallel with the steering shaft 23. A bracket 27 of the handlebar 25 is connected to the upper end of the steering link 26. The steering shaft 23, the handlebar 25 and the steering link 26 constitutes a parallel link mechanism, so that even when the position of the handlebar 25 is moved up and down according to the riding position of an operator P, an angle of inclination of the handlebar is always maintained to be constant.

As illustrated in FIGS. 1 and 2, a front ski 31 for steering the snowmobile is mounted on the lower end of the steering post 21 through links 28, 29 and a bracket 30, and an attitude of the front ski 31 is returned to its straight direction by means of an biasing or urging member 32.

Next, the suspension device will be described with reference to FIGS. 3A, 3B, 4 and 5. A shaft 40 is mounted in an intermediate portion between left and right main frames 1, 1. A cross pipe 41 is rotatably supported on the shaft 40. Front ends of a pair of left and right swing arms 42, 42 are swingingly supported on the cross pipe 41. A shaft 43 is mounted in an intermediate portion between the pair of swing arms 42, 42, and a triangular link 44 is rotatably supported on the shaft 43.

A front end of a rear shock absorber or cushion unit 45, including a hydraulic buffer 45a and a suspension spring 45b, is connected to the center of the cross pipe 41 arranged between the front ends of the pair of left and right swing arms 42, 42. That is, the front end of the rear shock absorber or cushion unit 45 is supported on the cross pipe 41 which is a part of the frame of the snowmobile instead of the swing arm 42.

The rear end of the rear cushion unit 45 is connected to one corner portion 44a of the triangular link 44. A shaft 46 is mounted in the intermediate portion between the left and right main frames 1, 1. A cross pipe 47 is rotatably supported on the shaft 46. An upper end of a link 48 is mounted on the cross pipe 47, and a lower end of the link 48 is connected to the other corner portion 44b of the triangular link 44.

Figure 5:
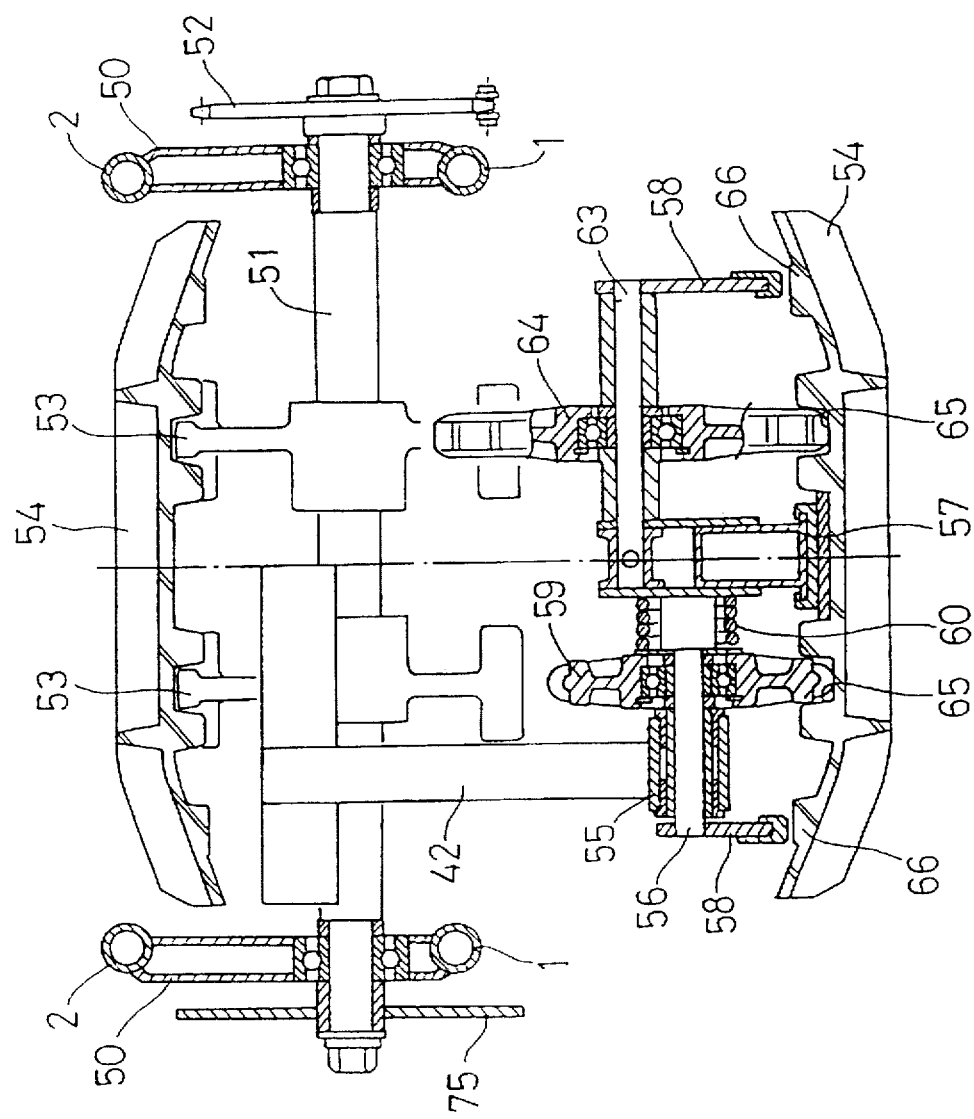
FIG. 5, right side, is a view taken along V—V of FIG. 3A, and FIG. 5, left side, is a view taken along V'—V' of FIG. 3A.

Gusset plates 50, 50 are provided in the vicinity of a cross portion between the main frame 1 and the upper frame 2, as shown in FIG. 5. A driving shaft 51 is rotatably supported between the gusset plates 50, 50. A sprocket 52, connected to an output shaft of the transmission 6 by a chain, is secured to one end of the driving shaft 51. A driving wheel 53 is mounted by means of a spline fitting or the like on the intermediate portion of the driving shaft 51, and a gear portion formed in the outer periphery of the driving shaft 53 is brought into engagement with a rugged portion formed in the inner side of the crawler belt 54.

The driving force of the engine 5 is transmitted to a drive pulley 70 of a belt converter as shown in FIG. 2. A belt 72 extends between the drive pulley 70 and a driven pulley 71. The rotation of the driven pulley 71 is transmitted to an idle shaft 73, and the rotation of the idle shaft 73 is transmitted to the sprocket 52 through a chain 74.

A brake disk 75, as illustrated in FIG. 5, is secured to the end of the driving shaft 51 on the side opposite to the sprocket 52, and a brake caliper 76 is provided, as shown in FIG. 3, in the vicinity of the brake disk 75.

On the other hand, a collar 55 is provided between rear ends of the left and right swing arms 42, 42. A shaft 56 is rotatably mounted in the collar 55. A main slide rail 57 extends in a lateral direction and is mounted in the central portion of the shaft 56 having a large diameter. A pair of left and right side slide rails 58, 58 are mounted on the outer end of the shaft 56 having a small diameter.

A guide wheel 59 is rotatably supported internally from the side slide rail 58 of the shaft 56. A spring 60 is provided for downwardly urging the front end of the main slide rail 57 disposed internally of the guide wheel 59. A shaft 61 is mounted between the main slide rail 57 and the front end of the side slide rail 58. A guide wheel 62 is rotatably supported on the shaft 61. A shaft 63 is mounted between the main slide rail 57 and the rear end of the side slide rail 58, and a guide wheel 64, having a larger diameter relative to the diameter of the guide wheel 62, is supported on the shaft 63 so that the guide wheel 64 can be adjusted in position and rotatably supported.

The guide wheels 59, 62 and 64 are fitted into a groove 65 formed in the inner surface of the crawler belt 54. A slight clearance is formed between the lower surface of the main slide rail 57 and the inner surface in the center of the crawler belt 54, and a slight clearance is formed between the lower surface of the side slide rail 58 and a protrusion 66 formed in the outer end widthwise of the crawler belt 54.

With the above-described arrangement, when the engine 5 is driven, the driving wheel 53 rotates, and the crawler belt 54 is moved by the rotation of the driving Wheel 53 so that the snowmobile is propelled. When the main slide rail 57 and the side slide rail 58 move up and down as the snowmobile is propelled, the swing arm 42 swings up and down around the shaft 40.

Figure 3A:
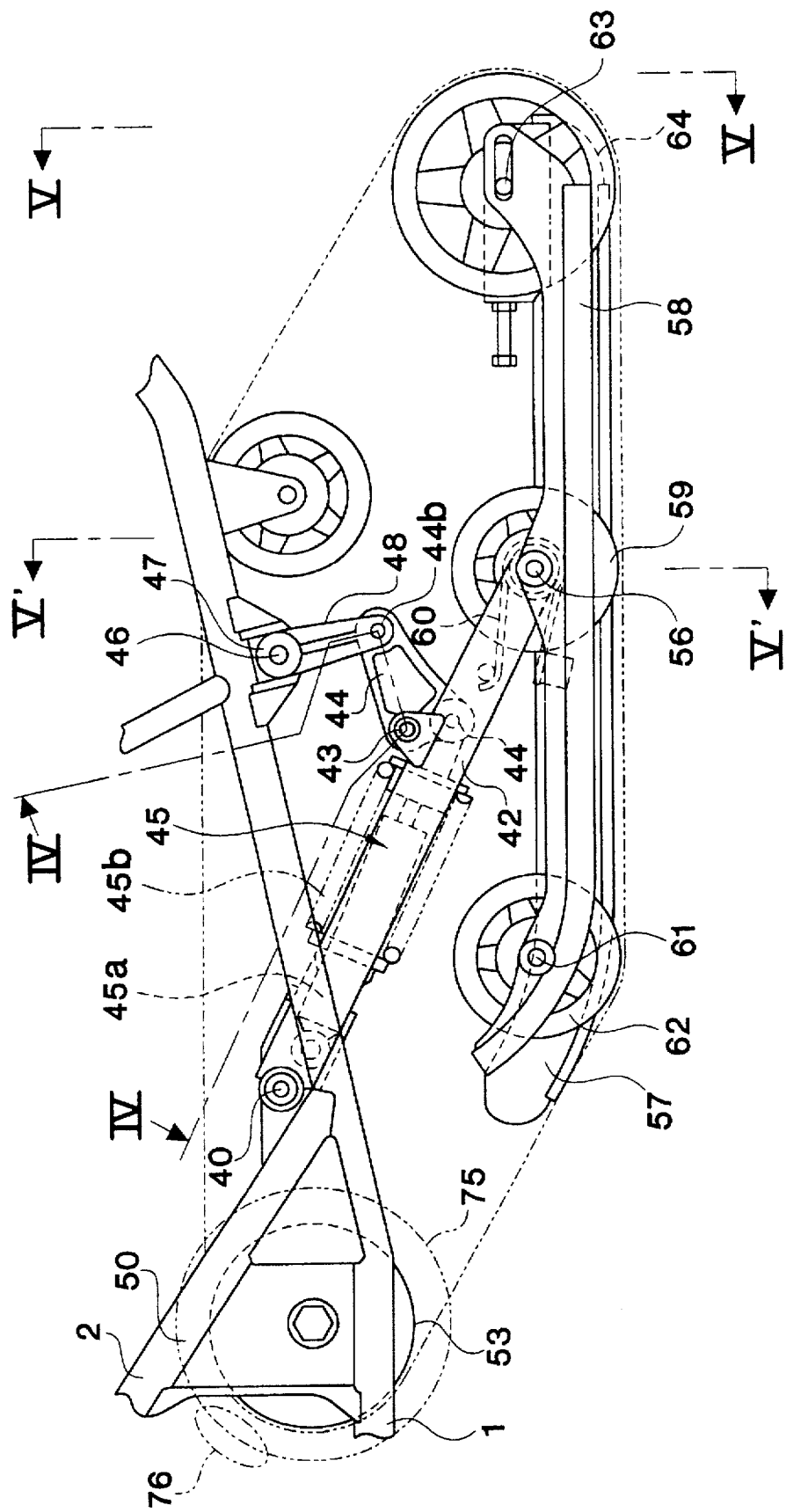
FIG. 3A is an enlarged side view showing the suspension device of the snowmobile and the periphery thereof.

When the swing arm swings upward from the state shown in FIG. 3A, the triangular link 44 swings in a clockwise direction around the shaft 43 to compress the hydraulic buffer 45a and as a result the attenuation force is generated. As the positions of the slide rails 57 and 58 become higher, the amount of rotation of the triangular link 44 increases so that the compression speed of the hydraulic buffer 45a becomes higher and the attenuation force produced also increases. That is, as the swing arm 42 swings upward, there is established a progressive link mechanism which gradually increases its attenuation force.

Figure 3B:
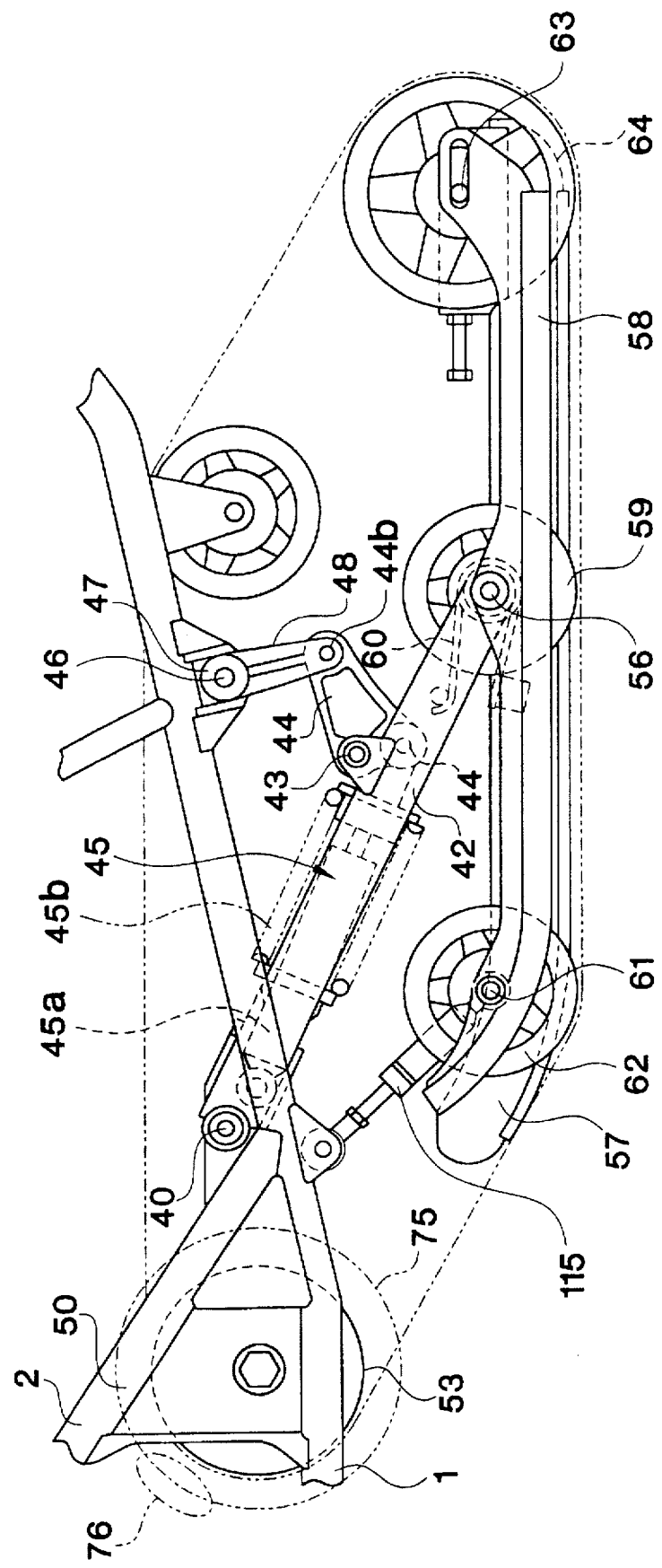
FIG. 3B is an enlarged side view showing a second embodiment of the suspension device of the snowmobile and the periphery thereof.
Figure 4:
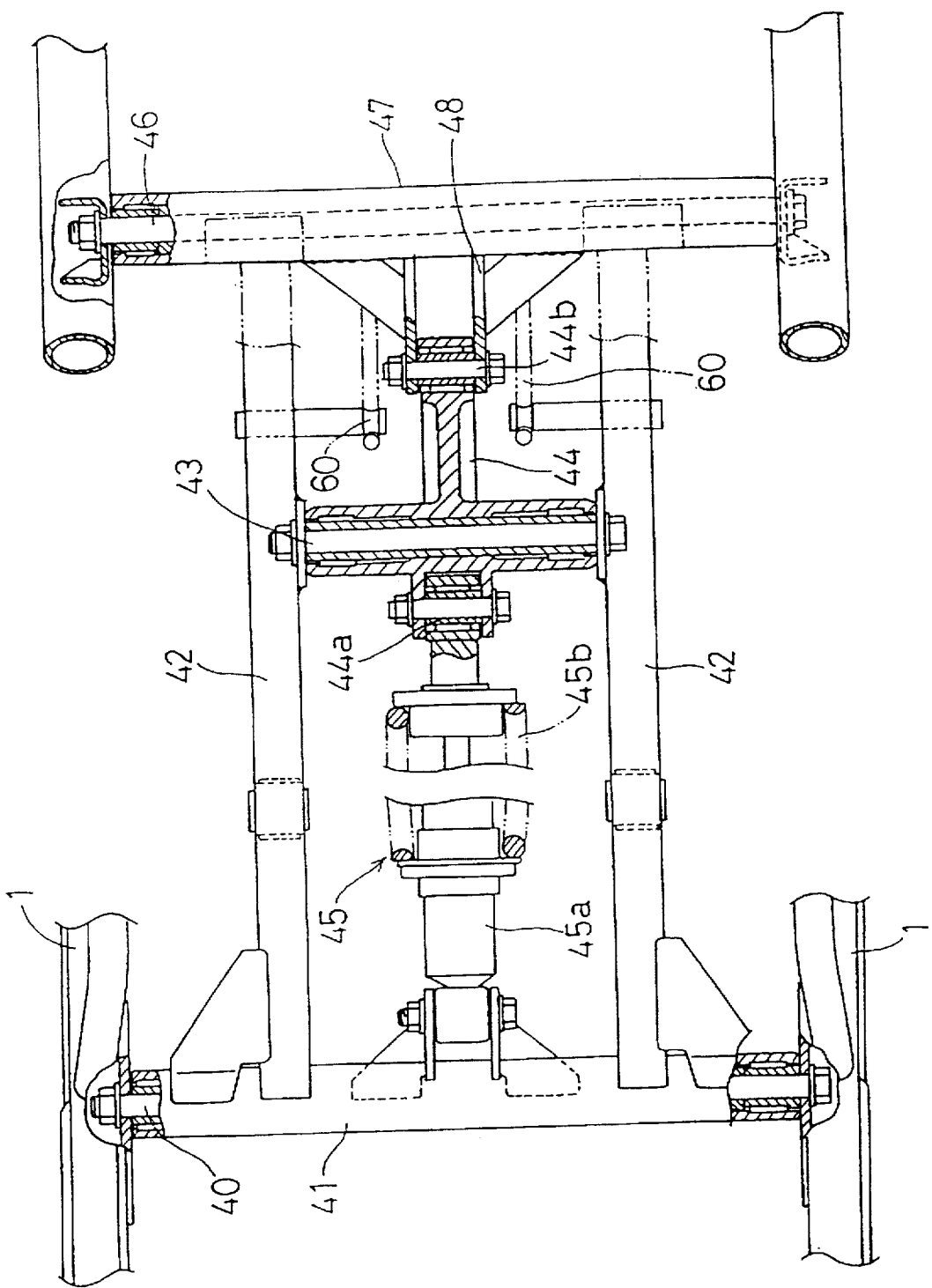
FIG. 4 is a view taken along IV—IV of FIG. 3A.

In another embodiment of the present invention, as illustrated in FIG. 3B, a pair of left and right shock absorbers or dampers 115 are interposed between the main frame 1 and the shaft 61, to define the swinging range of a combination of the main slide rail 57, the side slide rail 58 and guide wheels 59, 62 and 64, thus improving the controllability.

Figure 6:
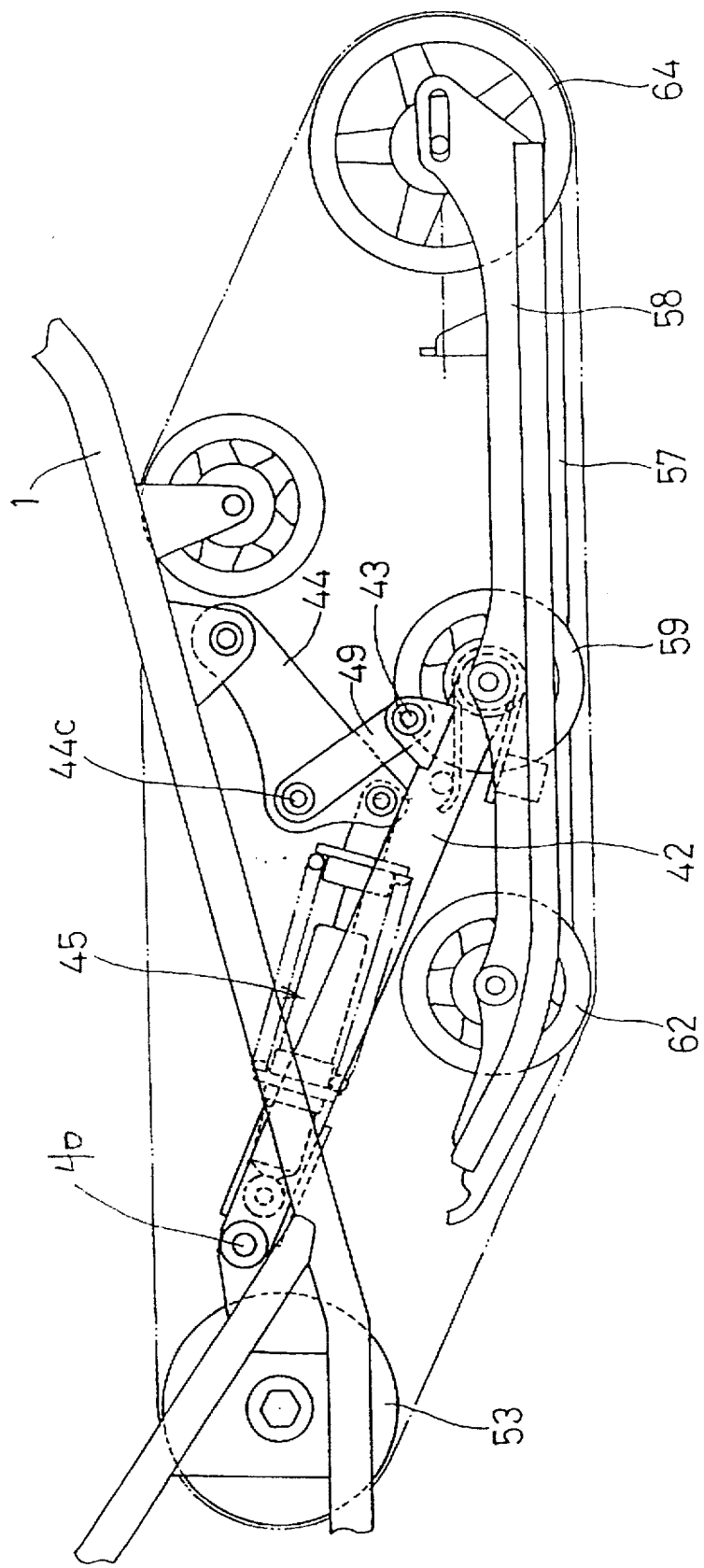
FIG. 6 is a view similar to FIG. 3A showing another embodiment.

FIG. 6 is a view similar to FIG. 3A illustrating a further embodiment. The same members as those previously described are indicated by the same reference numerals, description of which is omitted. While in the above-described embodiment, the triangular link 44 is directly connected to the swing arm 42 through the shaft 43, it is to be noted that in this embodiment, another link 49 is connected to the swing arm 42 through the shaft 43. The upper end of the link 49 is connected to a corner portion 44c of the triangular link 44.

By the provision of the arrangement as described above, it is possible to provide the snowmobile with an adequate progressive characteristic.

While in the above embodiment, a progressive link mechanism has been shown in which as the slide rail assumes an upper position. The transmission speed of the rear cushion unit increases to generate a large attenuation force. It is to be noted that the internal construction of the hydraulic buffer may be made of a stroke position dependent type to thereby vary the attenuation force produced.

As described above, according to the present invention, it is possible to convert a small vertical movement of the slide rail into a large horizontal movement to transmit it to the rear shock absorber or cushion unit. In addition, the front upper end of the rear shock absorber or cushion unit is connected to the frame side of the snowmobile body. Therefore, the weight of the rear cushion unit is not added to the lower load of the spring to enhance the fallibility relative to the snow surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension device for a snowmobile for resiliently supporting a snowmobile body comprising:
   a frame for supporting the snowmobile body;
   a slide rail for pressing a crawler belt against a snow surface;
   a swing arm having a front upper end pivotally supported on said frame and a rear lower end pivotally mounted on said slide rail; and
   a rear cushion unit having a hydraulic buffer and a suspension spring, said rear cushion unit includes a front upper end pivotally supported adjacent to the front upper end of said swing arm, and a rear lower end of said rear cushion unit is connected to said frame through a progressive link pivotally supported on the swing arm, the progressive link being a plate including a first end connected to said frame, a second end connected to said rear lower end of said rear cushion unit and a central portion connected to said swing arm.

2. The suspension device for a snowmobile according to claim 1, further comprising a crawler belt surrounding said slide rail and wherein the crawler belt includes an interior surface and said slide rail includes a main slide rail substantially centrally disposed relative to a width dimension of the crawler belt, said main slide rail engaging a groove disposed on the interior surface of the crawler belt for guiding the rotation of the crawler belt.

3. The suspension device for a snowmobile according to claim 2, and further including side slide rails disposed on each side of said main slide rail for guiding the rotation of the crawler belt.

4. The suspension device for a snowmobile according to claim 1, further comprising a crawler belt surrounding said slide rail and wherein the crawler belt includes an interior surface and further including a central guide wheel operatively mounted for rotation on a shaft supported on said slide rail, said central guide wheel engaging a groove disposed on the interior surface of the crawler belt for guiding the rotation of the crawler belt.

5. The suspension device for a snowmobile according to claim 4, and further including biasing means for biasing said swing arm away from the slide rail to urge the central guide wheel against the groove on the interior surface of the crawler belt.

6. The suspension device for a snowmobile according to claim 4, and further including a forward guide wheel engaging a groove disposed on the interior surface of the crawler belt for guiding the rotation of the crawler belt.

7. The suspension device for a snowmobile according to claim 4, and further including a rear guide wheel engaging a groove disposed on the interior surface of the crawler belt for guiding the rotation of the crawler belt.

8. The suspension device for a snowmobile according to claim 1, wherein said progressive link is a triangular link.

9. The suspension device for a snowmobile according to claim 1, further including a second link for operatively connecting said central portion of said plate to said swing arm.

10. The suspension device for a snowmobile according to claim 9, wherein said progressive link is a triangular link.

11. The suspension device for a snowmobile according to claim 6, wherein the front guide wheel is operatively mounted for rotating on a second shaft supported on the slide rail and wherein said suspension device further includes a second cushion unit having a first end operatively connected to said frame and a second end connected to the second shaft of said front guide wheel for defining a swinging range of said slide rail.

12. A suspension device for providing a resilient support for a snowmobile body comprising:
    a frame for supporting the snowmobile body;
    a slide rail for pressing a crawler belt against a snow surface;
    a swing arm having a first end pivotally supported on said frame and a second end pivotally mounted on said slide rail;
    a shock absorber including a first end pivotally supported on a shaft adjacent to the first end of said swing arm, and a second end of said shock absorber being connected to said frame through a progressive link pivotally supported on the swing arm, the progressive link being a plate including a first end connected to said frame, a second end connected to said rear lower end of said rear cushion unit and a central portion connected to said swing arm.

13. The suspension device for providing a resilient support for a snowmobile body according to claim 12, wherein said shocker absorber includes a hydraulic buffer and a suspension spring.

14. The suspension device for providing a resilient support for a snowmobile body according to claim 12, further comprising a crawler belt surrounding said slide rail and wherein the crawler belt includes an interior surface and said slide rail includes a main slide rail substantially centrally disposed relative to a width dimension of the crawler belt, said main slide rail engaging a groove disposed on the interior surface of the crawler belt for guiding the rotation of the crawler belt.

15. The suspension device for providing a resilient support for a snowmobile body according to claim 14, and further including side slide rails disposed on each side of said main slide rail for guiding the rotation of the crawler belt.

16. The suspension device for providing a resilient support for a snowmobile body according to claim 12, further comprising a crawler belt surrounding said slide rail and wherein the crawler belt includes an interior surface and further including a central guide wheel operatively mounted for rotation on a shaft supported on said slide rail, said central guide wheel engaging a groove disposed on the interior surface of the crawler belt for guiding the rotation of the crawler belt.

17. The suspension device for providing a resilient support for a snowmobile body according to claim 16, and further including biasing means for biasing said swing arm away from the slide rail to urge the central guide wheel against the groove on the interior surface of the crawler belt.

18. The suspension device for providing a resilient support for a snowmobile body according to claim 16, and further including a forward guide wheel engaging a groove disposed on the interior surface of the crawler belt for guiding the rotation of the crawler belt.

19. The suspension device for providing a resilient support for a snowmobile body according to claim 16, and further including a rear guide wheel engaging a groove disposed on the interior surface of the crawler belt for guiding the rotation of the crawler belt.

20. The suspension device for providing a resilient support for a snowmobile body according to claim 12, wherein said progressive link is a triangular link.

21. The suspension device for providing a resilient support for a snowmobile body according to claim 12, further including a second link for operatively connecting said central portion of said plate to said swing arm.

22. The suspension device for providing a resilient support for a snowmobile body according to claim 21, wherein, said progressive link is a triangular link.

23. The suspension device for providing a resilient support for a snowmobile body according to claim 18, wherein the front guide wheel is operatively mounted for rotation on a second shaft supported on the slide rail and wherein said suspension device further includes a second shocker absorber having a first end operatively connected to said frame and a second end connected to the second shaft of said front guide wheel for defining a swinging range of said slide rail.

* * * * *